United States Patent [19]
Faletti et al.

[11] Patent Number: 5,203,830
[45] Date of Patent: Apr. 20, 1993

[54] METHOD AND APPARATUS TO REDUCE ENGINE COMBUSTION NOISE UTILIZING UNIT VALVE ACTUATION

[75] Inventors: James J. Faletti, Spring Valley; Yung T. Bui, Peoria Heights, both of Ill.

[73] Assignee: Caterpillar Inc., Peoria, Ill.

[21] Appl. No.: 891,613

[22] Filed: Jun. 1, 1992

[51] Int. Cl.⁵ .................................... F02M 25/07
[52] U.S. Cl. .................. 123/568; 123/569; 123/571; 123/90.11; 123/90.16
[58] Field of Search ............ 123/568, 569, 571, 90.11, 123/90.16, 316, 179.1

[56] References Cited

U.S. PATENT DOCUMENTS

| | | | |
|---|---|---|---|
| 2,820,339 | 1/1958 | Grieshaber et al. | 123/316 |
| 2,931,347 | 4/1960 | Williams | 123/90.16 |
| 2,997,991 | 8/1961 | Roan | 123/90.16 |
| 3,548,798 | 12/1970 | Fleischer | 123/179.1 |
| 4,357,917 | 11/1982 | Aoyama | 123/90.16 |
| 4,422,430 | 12/1983 | Waitrak | 123/568 |
| 4,424,790 | 1/1984 | Curtil | 123/559 |
| 4,462,379 | 7/1984 | Tsuge et al. | 123/569 |
| 4,722,315 | 2/1988 | Pickel | 123/90.11 |
| 4,727,848 | 3/1988 | Stumpp et al. | 123/569 |
| 4,875,455 | 10/1989 | Hashimoto et al. | 123/568 |
| 4,926,823 | 5/1990 | Kishi et al. | 123/90.16 |
| 4,945,870 | 8/1990 | Richeson | 123/568 |
| 5,005,552 | 4/1991 | Kawamura | 123/571 |
| 5,123,397 | 6/1992 | Richeson | 123/571 |
| 5,129,623 | 7/1992 | Lockwood | 123/571 |

FOREIGN PATENT DOCUMENTS

| | | |
|---|---|---|
| 0397360 | 11/1990 | European Pat. Off. . |
| 59-093953A | 5/1984 | Japan . |
| 61-185601A | 8/1986 | Japan . |
| 2134596A | 8/1984 | United Kingdom . |

Primary Examiner—E. Rollins Cross
Assistant Examiner—M. Macy
Attorney, Agent, or Firm—Kenneth A. Rhoads

[57] ABSTRACT

An annoying problem with diesel engines is combustion noise especially under high speed, low load conditions. The problem is caused by the relatively long ignition delay period or the period of time from the start of fuel injection into the combustion chamber until ignition occurs. The length of the ignition delay period influences the severity of the noise produced as it determines the amount of fuel that is ready to be burned. The length of the ignition delay period is strongly dependent on cylinder gas temperature during the initial part of the fuel injection schedule. The present invention provides an apparatus to reduce the ignition delay period by elevating the temperature of the air in a selected one of the combustion chambers so that at the start of the compression stroke the air is elevated reducing the ignition delay period.

20 Claims, 4 Drawing Sheets

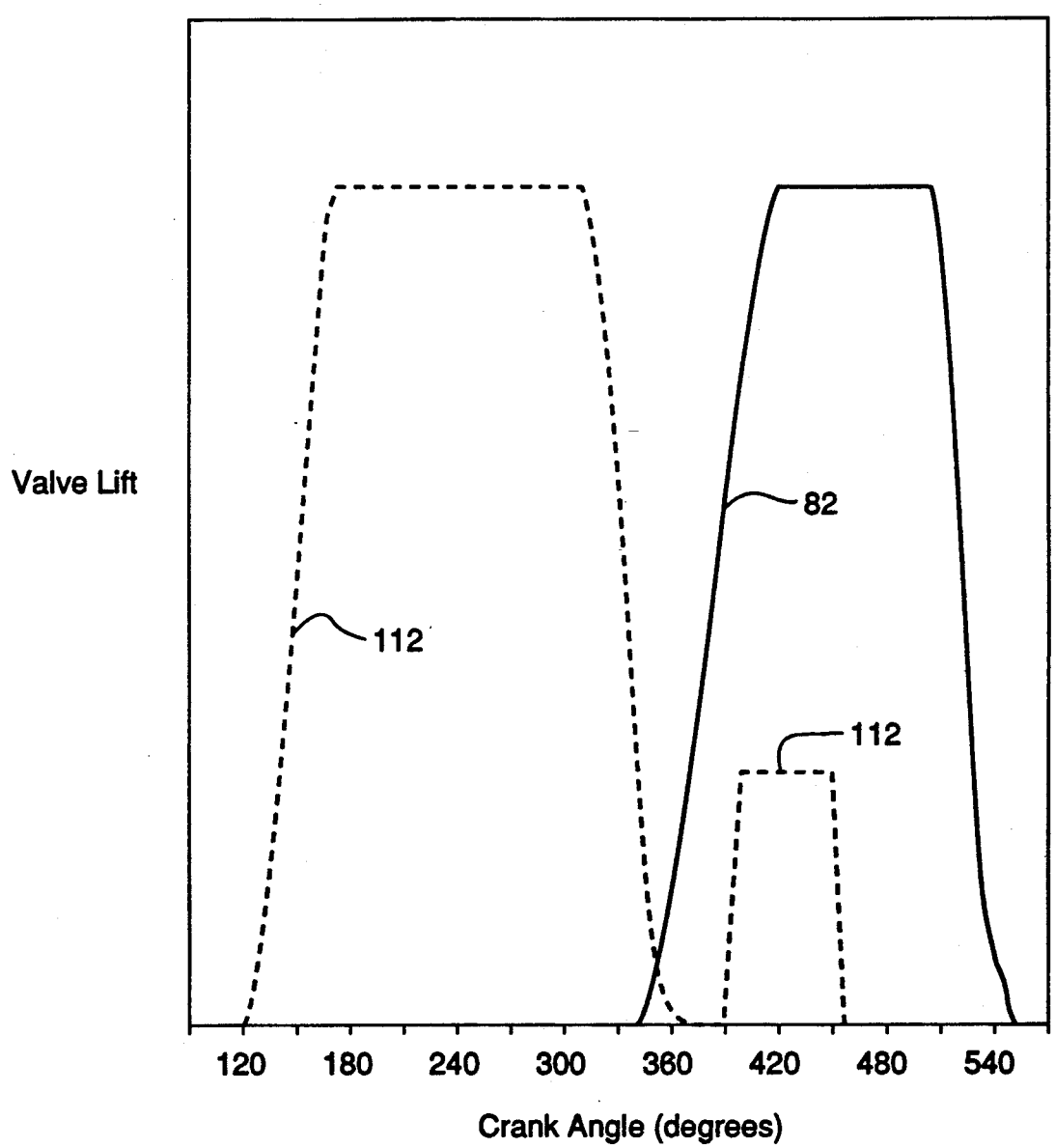

METHOD AND APPARATUS TO REDUCE ENGINE COMBUSTION NOISE UTILIZING UNIT VALVE ACTUATION

TECHNICAL FIELD

The present invention relates generally to the controlled operation of engine operation cycles and more particularly to a preestablished logic pattern and the modifying of the pattern to sequentially and modulateably controlling valve timing to reduce engine combustion noise.

BACKGROUND ART

An annoying problem with a diesel engine is combustion noise. A major portion of the combustion noise is generated during the premixed phase and arises from the combustion rate of the diesel fuel when it first ignites after the ignition delay period. The ignition delay period is the period of time from the start of fuel injection into the combustion chamber until ignition occurs. The length of the ignition delay period is dependent on several factors: the quality of the fuel, cetane number, and cylinder temperature. Fuel that has been properly vaporized and mixed with air burns in a very rapid manner which causes high rates of pressure rise in the cylinders and subsequent high noise levels. The length of the ignition delay period influences the severity of the noise produced as it determines the amount of fuel that will be ready to be burned. The length of the ignition delay is strongly dependent on combustion chamber air temperature during the initial part of the fuel injection schedule. Diesels are normally a lot louder at high speed, low load conditions than at high speed, high load conditions. Ignition delay tends to get longer at low loads because the cylinder walls are cooler and as the air is compressed on the compression stroke it looses more heat so at the beginning of fuel injection the temperature in the combustion chamber is relative low which delays ignition. Ignition delay also gets longer because fuel systems spray quality is often lower at low deliveries and air density is lower which results in slower rates of fuel mixing and vaporization.

Thus, what is needed is an apparatus to reduce combustion noise by elevating the temperature of the air in a selected one of the combustion chambers so that at the start of the compression stroke the temperature of the air is elevated reducing the preestablished ignition delay period.

The present invention is directed to overcome one or more of the problems as set forth above.

DISCLOSURE OF THE INVENTION

In one aspect of the invention, an apparatus to reduce combustion noise is adapted for use with an engine. The engine including a plurality of combustion chambers, an intake port, an exhaust port, and a piston reciprocally movable in each of the combustion chambers between a top dead center position and a bottom dead center position forming an intake stroke during which air is introduced from the intake port into the combustion chamber, movable between the bottom dead center position and the top dead center position forming a compression stroke during which the air in the cylinder is compressed to an established temperature and fuel is introduced at or before top dead center during which a desired ignition delay period occurs prior to combustion, and movable between the bottom dead center position and the top dead center position forming an exhaust stroke during which exhaust gas is expelled from the combustion chamber into the exhaust port. Flow control means including intake means operatively to selectively pass intake air into the combustion chambers during the intake stroke, and exhaust means operatively to selectively pass exhaust gas away from the combustion chambers during the exhaust stroke. The apparatus further includes means for actuating each of the intake means and the exhaust means independently in response to a control signal and electronic control means for introducing a controlled volume of exhaust gas into any selected combustion chamber by initiation of the exhaust means for the selected combustion chamber during its intake stroke following initiation of the intake stroke and terminating prior to completion of the intake stroke.

In another aspect of the invention, a method for reducing combustion noise of an engine is comprised of the following steps: passing intake air into the combustion chambers during the intake stroke, passing exhaust gas away from the combustion chambers during the exhaust stroke, actuating each of the intake means and the exhaust means independently in response to a control signal, and introducing a controlled volume of exhaust gas into any selected combustion chamber by initiation of the exhaust means for the selected combustion chamber during its intake stroke following initiation of the intake stroke and terminating prior to completion of the intake stroke.

BRIEF DESCRIPTION OF THE DRAWINGS

FIG. 4 is a graph showing valve lift for the intake and exhaust valves verses crankshaft angle for the engine.

BEST MODE FOR CARRYING OUT THE INVENTION

Figure 1:
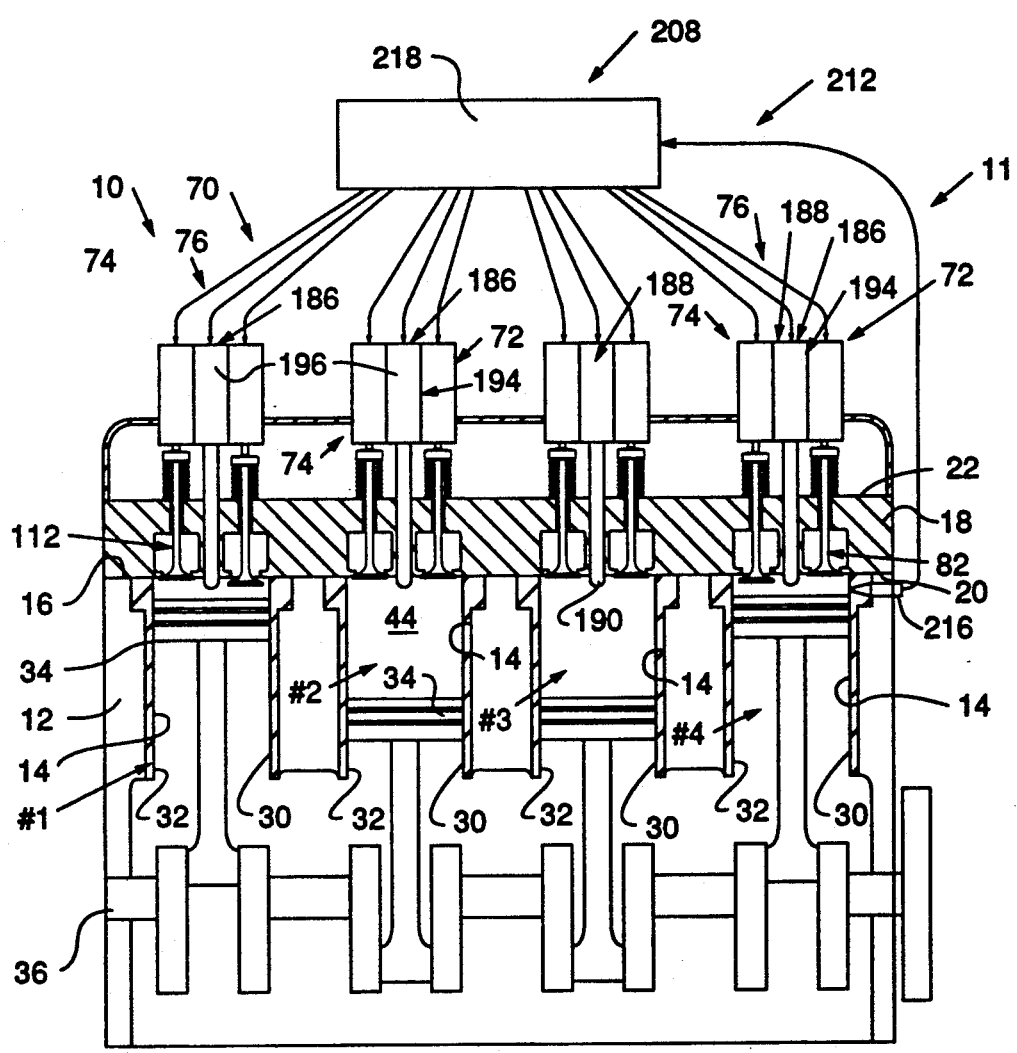
FIG. 1 is a diagrammatic side partially sectional view of an engine having an embodiment of the present invention.
Figure 2:
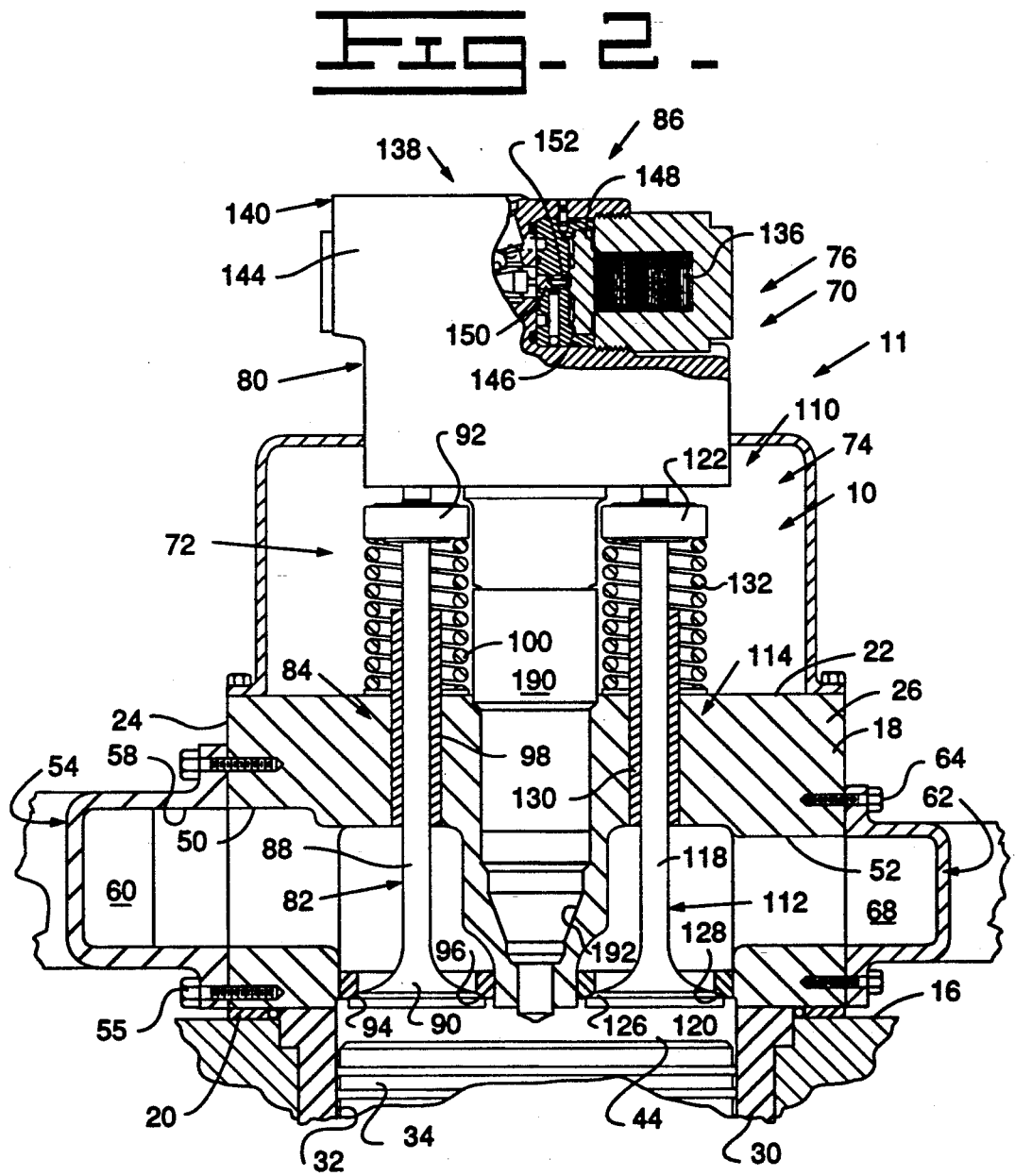
FIG. 2 is a cross-sectional view of a portion of the engine of FIG. 1.
Figure 3:
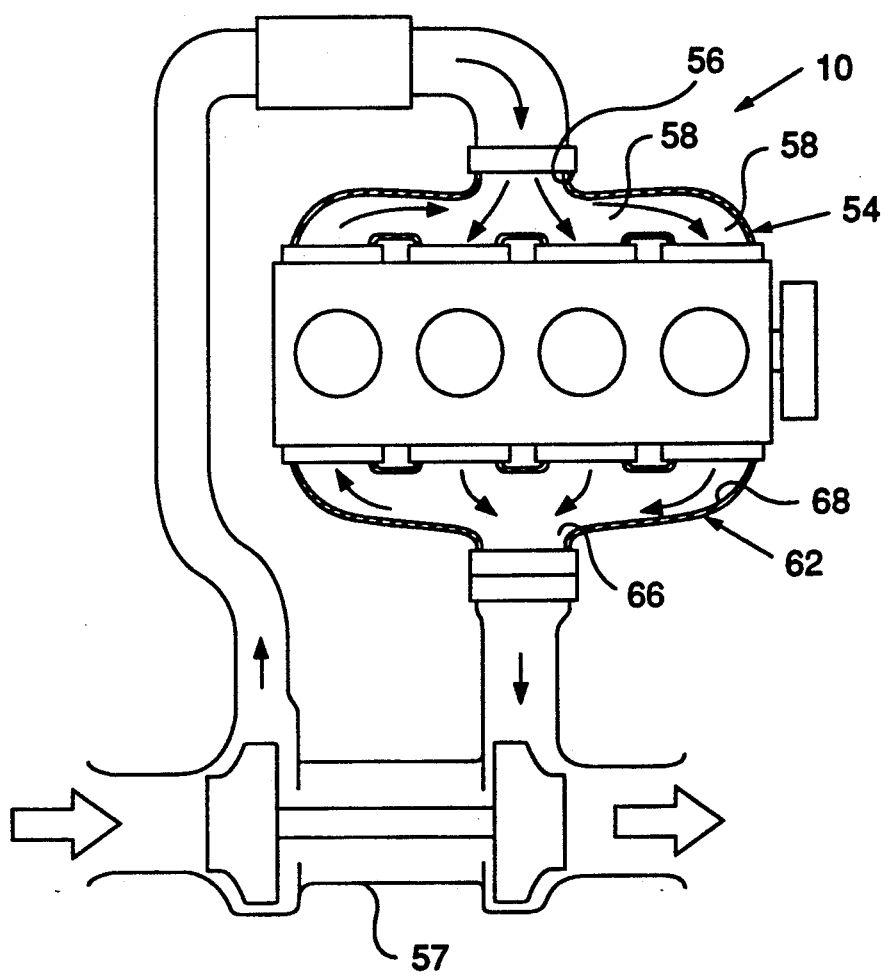
FIG. 3 is a schematic plan view of the engine of FIG. 1.

Referring to FIGS. 1, 2, and 3 an in line type, four cylinder, compression ignition, internal combustion engine 10 is schematically illustrated including an apparatus 11 to reduce engine combustion noise. The engine 10 in this specific instance is a conventional four cycle, compression ignition engine having sequential intake, compression, expansion, and exhaust strokes. Although the present invention will be described and disclosed with respect to an inline type four cylinder engine 10, it is recognized that the system could equally be used on for example, a multi-cylinder, vee type engine having different operating cycles and different methods of air-/exhaust manifolding systems. The engine 10 includes a block 12 defining a plurality of cylinder bores 14 and a top block mounting surface 16. The engine 10 further includes a cylinder head 18 having a bottom head mounting surface 20, a top head surface 22, a first head side mounting surface 24, and a second head side mounting surface 26. The bottom head mounting surface 20 is seated on the top block mounting surface 16 and rigidly attached thereto in the usual way by a plurality of fasteners not shown. Alternatively, the block 12 and the cylinder head 18 could be of an integral design.

In this application, a replaceable cylinder liner 30 having a piston liner bore 32 is positioned within each of the cylinder bores 14. The liner bores 32 define a plurality of cylinders #1, #2, #3, and #4. Each piston bore 32 has a piston 34 slidably disposed therein for driving a crankshaft 36 in a conventional manner. The crankshaft 36 is rotatively supported in the block 12. The pistons 34 reciprocally move in their respective liner bores 32 between a top dead center (TDC) position and a bottom dead center (BDC) position. A combustion chamber 44 is formed by the cylinder head 18, the liner bore 32, and the piston 34.

As representatively illustrated in FIG. 2, the cylinder head 18 defines for each of the combustion chambers 44 of the cylinders #1, #2, #3, and #4, an intake port 50 and an exhaust port 52. Each of the intake ports 50 extend from the first head side mounting surface 24 to the bottom head mounting surface 20. Each of the exhaust ports 52 extend from the second head side mounting surface 26 to the bottom head mounting surface 20.

The pistons 34 are reciprocally movable in each of the combustion chambers 44 between the top dead center position and the bottom dead center position forming the intake stroke during which air is introduced from the intake port 50 into the combustion chamber 44. The pistons 34 are further movable between the bottom dead center position and the top dead center position forming the compression stroke during which the air in the combustion chamber 44 is compressed to an established temperature range and fuel is introduced at or before top dead center during which a desired ignition delay period occurs prior to combustion of the mixture of fuel and air in the combustion chambers 44. Combustion of the fuel and air mixture occurs near top dead center movement of the pistons 34. As a result of combustion, the pistons 34 are driven in the combustion chambers 44 between the top dead center position and a bottom dead center position by the expanding exhaust gas forming the expansion stroke. The pistons 34 are still movable between the bottom dead center position and the top dead center position forming an exhaust stroke during which exhaust gas is expelled from the combustion chamber 44 into the exhaust port 52.

As best shown in FIGS. 2 and 3, an intake conducting means 53 is operatively connected to the combustion chambers 44 for directing intake air into the combustion chambers. The conducting means 53 includes an intake manifold 54 which is rigidly attached to the first head side surface 24 in the usual way by a plurality of fasteners 55. The intake manifold 54 defines an intake manifold passage 56 connected to a turbocharger 57 and a plurality of interconnected intake manifold branch passages 58 in a conventional manner. The intake manifold branch passages 58 are in fluid communication with the intake ports 50 in a conventional manner.

An exhaust conducting means 60 is operatively connected to the combustion chambers 44 for directing exhaust gas away from and into the combustion chambers. The exhaust conducting means 60 includes an exhaust manifold 62 which is attached to the second head mounting surface 26 in the usual way by a plurality of fasteners 64. The exhaust manifold 62 defines an exhaust manifold passage 66 connected to the turbocharger 57 and a plurality of interconnected exhaust manifold branch passages 68 in a conventional manner. The exhaust manifold branch passages 68 are in fluid communication with the exhaust ports 52 in a conventional manner.

The engine 10 further includes flow control means 70 for selectively communicating the intake manifold 54 and the exhaust manifold 62 with the combustion chambers 44. The flow control means 70 include for each of the combustion chambers 44, intake means 72, exhaust means 74, and means 76 for actuating each of the intake means and the exhaust means independently in response to a control signal.

The intake means 72 include, in this specific instance, an intake valve 82 operatively mounted in each one of the intake ports 50, and intake valve support means 84 for reciprocally supporting the intake valve 82 in the cylinder head 18. It is recognized that the intake means 72 could include multiple intake valves 82 and intake valve support means 84.

The intake valve 82 includes an intake valve stem 88, an intake valve head portion 90 disposed at one end of the intake valve stem, and an intake valve retainer 92 disposed at an opposite end. The intake valve head portion 90 defines an annular intake valve sealing surface 94 of a dimension sufficient for sealingly seating on an annular intake port seating face 96 about the intake port 50.

The intake valve support means 84 includes an intake valve guide 98. The intake valve guide 98 is mounted in the cylinder head 18 and encompasses the intake valve stem 88. An intake valve spring 100 is disposed about the intake valve stem 88 and extends between the top head surface 22 and the intake valve retainer 92. The intake valve spring 100 urges the intake valve sealing surface 94 against the intake port seating face 96 until the intake valve seating surface is moved away from the intake port seating face.

Referring to FIGS. 1 and 2, the exhaust means 74 includes, in this specific instance, an exhaust valve 112 operatively mounted in each one of the exhaust ports 52 and an exhaust valve support means 114 for reciprocally supporting the exhaust valve 112 in the cylinder head 18. It is recognized that the exhaust means 74 could include multiple exhaust valves 112 and exhaust valve support means 154.

The exhaust valve 112 includes an exhaust valve stem 118, an exhaust valve head portion 120 disposed at one end of the exhaust valve stem, and an exhaust valve retainer 122 disposed at an opposite end. The exhaust valve head portion 120 defines an annular exhaust valve sealing surface 126 of a dimension sufficient for sealingly seating on an annular exhaust port seating face 128 defined about the exhaust port 52.

The exhaust valve support means 114 includes an exhaust valve guide 130. The exhaust valve guide 130 is mounted in the cylinder head 18 and encompasses the exhaust valve stem 118. An exhaust valve spring 132 is disposed about the exhaust valve stem 118 and extends between the top head surface 22 and the exhaust valve retainer 122. The exhaust valve spring 132 urges the exhaust valve sealing surface 126 against the exhaust port seating face 128 until the exhaust valve seating surface is moved away from the exhaust port seating face 128.

In the preferred embodiment as best shown in FIG. 2, the means 76 for actuating each of the intake means 72 and exhaust means 74 includes a like number of piezoelectric motors 136, only one shown. It is recognized that in place of the piezoelectric motors 136, solenoids, voice coils, or linear displaceable electromagnetic assemblies could be used. Each piezoelectric motor 136 is housed in unit valve actuator means 138. The unit valve actuator means 138 includes a valve actuator assembly 140 operatively engaged with the respective intake and exhaust valves 82 and 112 adjacent the respective intake and exhaust valve retainers 92 and 122 for electronically manipulating the intake and exhaust valves The valve actuator assembly 140 includes, a valve actuator housing 144 having a stepped cavity 146 in which is positioned an actuator valve drive piston 148, an actuator valve amplifier piston 150, and an actuator valve fluid chamber 152 therebetween.

The piezoelectric motor 136, which is well-known in the art, expands linearly responsive to electrical excitation by a preestablished quantity of energy and contracts when the electrical excitation is ended. Variations in the amount of electrical excitation will cause the piezoelectric motor 136 to expand linearly dependent on the amount of electrical excitation. The piezoelectric motor 136 generates a high force in a linear direction, however, its linear expansion is less than what is required to displace the intake and exhaust valve sealing surfaces 94 and 126 away from the intake and exhaust port seating faces 96 and 128. Therefore, the actuator valve drive piston 148, actuator valve amplifier piston 150, and the actuator valve fluid chamber 152 are provided to translate and amplify linear displacement of the piezoelectric motor 136 in the following manner. The actuator valve amplifier piston 150 is sized much smaller than the actuator valve drive piston 148 because the hydraulic amplification ratio of the linear displacement of the actuator valve driver piston 148 as it relates to the linear displacement of the actuator valve amplifier piston 150 is inversely proportional to the surface area ratio of the actuator valve driver piston 148 to the actuator valve amplifier piston 150. Thus, small linear displacement of the piezoelectric motor 136 is amplified to produce significantly greater linear displacement of the actuator valve amplifier piston 150.

The engine 10 further includes fuel injector means 186 for each of the combustion chambers 44. The fuel injector means 186 includes, as best shown in FIGS. 1 and 2, an electronically controlled unit fuel injector 190 of a conventional design disposed in a stepped ejector bore 192 defined in the cylinder head 18 and the means 76 for electronically controlling each of the unit fuel injectors 190 independently. The means 76 is operatively engaged with each unit fuel injector 190. Because the means 76 for the unit fuel injector 190 is essentially the same design and functions in essentially the same manner as means 76 for the intake and exhaust means 72 and 74 they will not be described in detail. As an alternative, any conventional fuel system could be used.

As shown in FIG. 1, an electronic control system 208 is operatively connected to the actuating means 76 and adapted to direct appropriate control signals therefrom to the actuating means to functionally control the engine 10 in a first predetermined logic pattern for normal engine operation.

The apparatus 11 to reduce combustion noise includes electronic control means 212 for causing the control signals to be outputted to the actuating means 76 in a second predetermined logic pattern different than the first predetermined logic pattern.

FIG. 4 is a graph showing an example of the intake valve 82 and the exhaust valve 112 lift versus crankshaft 36 angle in degrees for a portion of an operating cycle. The intake valve 82 is shown by solid lines and the exhaust valve 112 is shown by broken lines. As shown, the exhaust valve 112 is typically open, i.e., the exhaust valve sealing surface 126 is moved away from the exhaust port seating face 128 by the actuation means 76, from approximately 120 to 365 degrees of crankshaft 36 angle. The intake valve 82 is typically open, i.e., the intake valve sealing surface 94 is moved away from the intake port seating face 96 by the actuation means 76, from approximately 340 to 550 degrees of crankshaft 36 angle.

The electronic control means 212 includes the electronic control system 208, the control signals, a plurality of sensor 216, one of which is shown, and a microprocessor 218. The engine 10 operating parameters such as, temperature, rpm's, load, and air-fuel mixture, are sensed by the sensors 216 and sent to the microprocessor 218. The microprocessor 218 uses a program logic to process the information provided by the sensors 216 and based upon the results of the analysis supplies an electrical current to selected ones of the piezoelectric motors 136 for actuation of the intake valve unit actuator means 86, the exhaust valve unit actuator means 156, and the fuel injector unit actuator means 194. The intake valves 82, the exhaust valves 152, and the fuel injectors 190 are all independently controlled so as to produce optimum timing events of valve opening and closing and fuel injection for various engine 10 operating conditions.

INDUSTRIAL APPLICABILITY

In use, the engine 10 utilizes the means 76 for unit actuating the intake and exhaust valve means 72 and 74. The means 76 for unit actuating allows the freedom to change both valve timing and the number of times the intake and exhaust valves 82 and 112 are operating during the engine cycle independent of crankshaft 36 rotational position. The method of valve scheduling in this invention produces higher combustion chamber 44 air temperatures during the ignition delay period of the compression stroke. This is accomplished without penalty in fuel consumption at high speed low load conditions.

The electronic control means 212 including the electronic control system 208, the control signals, the sensors 216, and the microprocessor 218 is operatively connected to the actuating means 76 to functionally control the engine 10 in the first predetermined logic pattern. In the first predetermined logic pattern, during the intake stroke of one of the combustion chambers 44 the intake valve 82 is open and the exhaust valve 152 is closed for the duration of intake stroke and during the exhaust stroke of another one of the combustion chambers 44 the intake valve is closed and the exhaust valve is open.

The electronic control means 212 acts in response to sensed operating parameters of the engine 10 which causes the control signals to be outputted to the actuating means 76 in the second predetermined logic pattern. During the second predetermined logic pattern a controlled volume of exhaust gas is introduced into any selected combustion chamber 44 from the exhaust gas conducting means 53 by initiation or opening of the exhaust means 74 for the selected combustion chamber during its intake stroke following initiation or opening of the intake stroke and terminating prior to completion of the intake stroke effectively elevating the temperature of the air in the selected one of the combustion chambers 44 so that at the start of the compression stroke the temperature of the air is raised reducing the preestablished ignition delay period.

As best shown in FIGS. 3 and 4, the exhaust valve 112 of any selected one of the combustion chambers 44 is opened during its intake stroke at a time which will allow exhaust gas to flow into the combustion chamber 44 via the exhaust manifold branch passages 68. The controlled volume of exhaust gas is accomplished by a reinitiation the exhaust means 74 after initiation of the intake means 72. The resulting cylinder temperatures at the start of the compression stroke and during the ignition delay period are thus, elevated. This allows for a shorter ignition delay period which reduces combustion noise.

Other aspects, objects and advantages of this invention can be obtained from a study of the drawings, the disclosure and the appended claims.

We claim:

1. An apparatus adapted for use with an engine to reduce combustion noise, the engine including a plurality of combustion chambers, an intake port, an exhaust port, and a piston being reciprocally movable in each of the combustion chambers between a top dead center position and a bottom dead center position forming an intake stroke during which air is introduced from the intake port into the combustion chamber, movable between the bottom dead center position and the top dead center position forming a compression stroke during which the air in the combustion chamber is compressed to an established temperature range and fuel is introduced at or before top dead center during which a desired ignition delay period occurs prior to combustion, and movable between the bottom dead center position and the top dead center position forming an exhaust stroke during which exhaust gas is expelled from the combustion chamber into the exhaust port, the apparatus comprising:

flow control means including intake means for selectively passing intake air into the combustion chambers during their intake stroke, and exhaust means for selectively passing exhaust gas away from the combustion chambers during their exhaust stroke;

means for actuating each of the intake means and the exhaust means independently in response to a control signal;

exhaust gas conducting means operatively connected to the combustion chambers for directing exhaust gas; and electronic control means for introducing a controlled volume of exhaust gas into any selected combustion chamber from the exhaust gas conducting means by initiation of the exhaust means for the selected combustion chamber during its exhaust stroke into a selected one of the combustion chambers during its intake stroke following initiation of the intake stroke and terminating prior to completion of the intake stroke effectively elevating the temperature of the air in the selected one of the combustion chambers.

2. The apparatus of claim 1 wherein the introducing a controlled volume of exhaust gas is accomplished by a reinitiation of the exhaust means after initiation of the intake means.

3. The apparatus of claim 1 wherein the engine includes a cylinder head having a top head surface and the intake means includes a plurality of intake valves each operatively mounted in each one of the intake ports, and intake valve support means for reciprocally supporting the intake valve in the cylinder head.

4. The apparatus of claim 3 wherein the intake valve includes an intake valve stem, an intake valve head portion disposed at one end of the intake valve stem and an intake valve retainer disposed at an opposite end, and the intake valve support means includes an intake valve guide mounted in the cylinder head and encompassing the intake valve stem and an intake valve spring and disposed about the intake valve stem and extending between the top head surface and the intake valve retainer.

5. The apparatus of claim 4 wherein the exhaust means includes a plurality of exhaust valves each operatively mounted in one of the exhaust ports, and exhaust valve support means for reciprocally supporting the exhaust valves in the cylinder head.

6. The apparatus of claim 5 wherein the exhaust valve includes an exhaust valve stem, an exhaust valve head portion disposed at one end of the exhaust valve stem and an exhaust valve retainer disposed at an opposite end, and exhaust valve support means includes an exhaust valve guide mounted in the cylinder head and encompassing the exhaust valve stem and an exhaust valve spring and disposed about the exhaust valve stem and extending between the the top head surface and the exhaust valve retainer.

7. The apparatus of claim 1 wherein the means for actuating includes a piezoelectric motor.

8. The apparatus of claim 1 wherein the electronic control mean includes an electronic control system, a control signal, a sensor, and a microprocessor.

9. An apparatus adapted for use with an engine, the engine including a plurality of combustion chambers, an intake port, an exhaust port, and a piston being reciprocally movable in each of the combustion chambers between a top dead center position and a bottom dead center position forming an intake stroke during which air is introduced from the intake port into the combustion chamber, movable between the bottom dead center position and the top dead center position forming a compression stroke during which the air in the combustion chamber is compressed to an established temperature range and fuel is introduced at or before top dead center during which a desired ignition delay period occurs prior to combustion, and movable between the bottom dead center position and the top dead center position forming an exhaust stroke during which exhaust gas is expelled from the combustion chamber into the exhaust port, the apparatus comprising:

flow control means including an intake valve operatively mounted in each one of the intake ports to selectively pass intake air into the combustion chambers during the intake stroke, and an exhaust valve operatively mounted in each one of the exhaust ports to selectively pass exhaust gas away from the combustion chambers during the exhaust stroke;

means for actuating each of the intake valve and the exhaust valve independently in response to a control signal; and electronic control means responsive to sensed operating parameters to allow a controlled volume of exhaust gas therefrom to enter any preselected combustion chamber during its intake stroke following initiation of its intake stroke and terminating prior to completion of its intake stroke to elevate the temperature of the compressed air in the preselected combustion chamber.

10. The apparatus of claim 9 wherein the engine includes a cylinder head having a top head surface and the flow control means further includes intake valve support means for reciprocally supporting the intake valves in the cylinder head and exhaust valve support means for reciprocally supporting the exhaust valves in the cylinder head.

11. The apparatus of claim 10 wherein the intake valve includes an intake valve stem, an intake valve head portion disposed at one end of the intake valve stem and an intake valve retainer disposed at an opposite end, and the intake valve support means includes an intake valve guide mounted in the cylinder head and encompassing the intake valve stem and an intake valve spring and disposed about the intake valve stem and extending between the top head surface and the intake valve retainer.

12. The apparatus of claim 11 wherein the exhaust valve includes an exhaust valve stem, an exhaust valve head portion disposed at one end of the exhaust valve stem and an exhaust valve retainer disposed at an opposite end, and exhaust valve support means includes an exhaust valve guide mounted in the cylinder head and encompassing the exhaust valve stem and an exhaust valve spring and disposed about the exhaust valve stem and extending between the top head surface and the exhaust valve retainer.

13. The apparatus of claim 9 wherein the means for actuating includes a piezoelectric motor.

14. The apparatus of claim 9 wherein the electronic control mean includes an electronic control system, a control signal, a sensor, and a microprocessor.

15. An apparatus adapted for use with an engine, the engine including a plurality of combustion chambers, an intake port, an exhaust port, and a piston being reciprocally movable in each of the combustion chambers between a top dead center position and a bottom dead center position forming an intake stroke during which air is introduced from the intake port into the combustion chamber, movable between the bottom dead center position and the top dead center position forming a compression stroke during which the air in the combustion chamber is compressed to an established temperature range and fuel is introduced at or before top dead center during which a desired ignition delay period occurs prior to combustion, and movable between the bottom dead center position and the top dead center position forming an exhaust stroke during which exhaust gas is expelled from the combustion chamber into the exhaust port, the apparatus comprising:

an intake valve operatively mounted in each intake port to selectively pass intake air into the combustion chambers during the intake stroke, and an exhaust valve operatively mounted in each exhaust port to selectively pass exhaust gas away from the combustion chambers during the exhaust stroke;

means including a piezoelectric motor for actuating each of the intake valves and the exhaust valves independently in response to a control signal; and electronic control means for introducing a controlled volume of exhaust gas to any preselected combustion chambers during its intake stroke following initiation of the intake stroke and terminating prior to completion of the intake stroke so that at the start of the compression stroke the temperature of the compressed air in the combustion chamber is elevated reducing the ignition delay period, the electronic control means acts in response to sensed operating parameters.

16. The apparatus of claim 15 wherein the engine includes a cylinder head having a top head surface and the apparatus includes intake valve support means for reciprocally supporting the intake valves in the cylinder head and exhaust valve support means for reciprocally supporting the exhaust valves in the cylinder head.

17. The apparatus of claim 16 wherein the intake valve includes an intake valve stem, an intake valve head portion disposed at one end of the intake valve stem and an intake valve retainer disposed at an opposite end, and the intake valve support means includes an intake valve guide mounted in the cylinder head and encompassing the intake valve stem and an intake valve spring and disposed about the intake valve stem and extending between the top head surface and the intake valve retainer.

18. The apparatus of claim 17 wherein the exhaust valve includes an exhaust valve stem, an exhaust valve head portion disposed at one end of the exhaust valve stem and an exhaust valve retainer disposed at an opposite end, and exhaust valve support means includes an exhaust valve guide mounted in the cylinder head and encompassing the exhaust valve stem and an exhaust valve spring and disposed about the exhaust valve stem and extending between the top head surface and the exhaust valve retainer.

19. The apparatus of claim 15 wherein the electronic control mean includes an electronic control system, a control signal, a sensor, and a microprocessor.

20. A method of operating an engine having a plurality of combustion chambers, an intake port, an exhaust port, and a piston being reciprocally movable in each of the combustion chambers between a top dead center position and a bottom dead center position forming an intake stroke during which air is introduced from the intake port into the combustion chamber, movable between the bottom dead center position and the top dead center position forming a compression stroke during which the air in the cylinder is compressed to a preestablished temperature and fuel is introduced at or before top dead center during which a preestablished ignition delay period occurs prior to combustion, and movable between the bottom dead center position and the top dead center position forming an exhaust stroke during which exhaust gas is expelled from the combustion chamber into the exhaust port, comprising the steps of:

(a) passing intake air into the combustion chambers during the intake stroke;

(b) passing exhaust gas away from the combustion chambers during the exhaust stroke;

(c) actuating each of the intake means and the exhaust means independently in response to a control signal; and (d) introducing a controlled volume of exhaust gas into any selected combustion chamber by initiation of the exhaust means for the selected combustion chamber during its intake stroke following initiation of the intake stroke and terminating prior to completion of the intake stroke effectively elevating the temperature of the air in the selected combustion chambers.

* * * * *